United States Patent
Combe et al.

(10) Patent No.: US 8,813,340 B2
(45) Date of Patent: Aug. 26, 2014

(54) ARRANGEMENT FOR MOUNTING THE FRONT TECHNICAL SURFACE OF A VEHICLE

(75) Inventors: Francois Combe, Meulan (FR); Michael Flandin, Broue (FR); Nicolas Pietu, Guyancourt (FR)

(73) Assignee: Renault S.A.S., Boulogne-Billancourt (FR)

( * ) Notice: Subject to any disclaimer, the term of this patent is extended or adjusted under 35 U.S.C. 154(b) by 662 days.

(21) Appl. No.: 13/122,293

(22) PCT Filed: Oct. 1, 2009

(86) PCT No.: PCT/FR2009/051875
§ 371 (c)(1),
(2), (4) Date: Jun. 22, 2011

(87) PCT Pub. No.: WO2010/037981
PCT Pub. Date: Apr. 8, 2010

(65) Prior Publication Data
US 2011/0240829 A1 Oct. 6, 2011

(30) Foreign Application Priority Data
Oct. 3, 2008 (FR) ...................................... 08 56719

(51) Int. Cl.
*B62D 65/16* (2006.01)
*B62D 65/02* (2006.01)
*B62D 25/08* (2006.01)
*B62D 65/04* (2006.01)
*B60K 11/04* (2006.01)

(52) U.S. Cl.
CPC .............. *B62D 25/084* (2013.01); *B62D 65/04* (2013.01); *B60K 11/04* (2013.01)
USPC ........ 29/464; 29/407.09; 29/281.4; 29/897.2; 29/281.1; 180/69.21; 180/89.17; 293/118

(58) Field of Classification Search
USPC ................ 29/897.2, 407.09, 407.1, 464, 559, 29/281.1, 281.4; 180/69.21, 89.17; 293/118
See application file for complete search history.

(56) References Cited

U.S. PATENT DOCUMENTS 5,123,695 A * 6/1992 Kanemitsu et al. ...... 296/193.09
5,155,891 A * 10/1992 Yoshii et al. .................... 29/430
(Continued)

FOREIGN PATENT DOCUMENTS

DE 102007017167 A1 * 12/2008 ............. B62D 65/02
EP 1 247 908 10/2002
(Continued)

OTHER PUBLICATIONS

International Search Report issued Mar. 30, 2010 in PCT/FR09/51875 filed Oct. 1, 2009.

*Primary Examiner* — David Bryant
*Assistant Examiner* — Jason L Vaughan
(74) *Attorney, Agent, or Firm* — Oblon, Spivak, McClelland, Maier & Neustadt, L.L.P.

(57) ABSTRACT

An arrangement for mounting a substantially vertical mechanical element, as a technical front surface, on a structural transverse element of bodywork of a vehicle such as an upper crossbar, the mechanical element including at least one substantially horizontal portion or structural nozzle bearing on an upper surface of the crossbar. The arrangement includes at least one carrier plate for the mechanical element which is slid under the bodywork of the vehicle and then mounted vertically. The plate includes a yoke for receiving the vertical mechanical element and which is capable of holding the element between at least one vertical position inclined towards the front and a vertical position.

8 Claims, 1 Drawing Sheet

(56) References Cited

U.S. PATENT DOCUMENTS

| | | | |
|---|---|---|---|
| 6,173,947 B1 * | 1/2001 | Johnson | 269/17 |
| 6,205,638 B1 * | 3/2001 | Yustick | 29/464 |
| 6,708,393 B1 * | 3/2004 | Roy et al. | 29/714 |
| 6,729,681 B2 * | 5/2004 | Yustick | 296/193.01 |
| 6,769,171 B2 * | 8/2004 | Jung | 29/700 |
| 6,785,944 B1 * | 9/2004 | Herbkersman et al. | 29/281.1 |
| 7,032,283 B2 * | 4/2006 | Tashiro et al. | 29/428 |
| 7,207,549 B2 * | 4/2007 | Crawford | 254/134 |
| 8,117,723 B2 * | 2/2012 | Jin | 29/281.5 |
| 8,245,382 B2 * | 8/2012 | Flandin | 29/464 |
| 8,312,630 B2 * | 11/2012 | Bogaert et al. | 29/897.2 |
| 2002/0053806 A1 * | 5/2002 | Lanard et al. | 293/118 |
| 2002/0139594 A1 | 10/2002 | Gabioli | |
| 2003/0019090 A1 * | 1/2003 | Matsumoto et al. | 29/428 |
| 2003/0150094 A1 | 8/2003 | Tashiro et al. | |
| 2009/0302643 A1 | 12/2009 | Bogaert et al. | |
| 2010/0164250 A1 | 7/2010 | Flandin | |

FOREIGN PATENT DOCUMENTS

| | | | | |
|---|---|---|---|---|
| EP | 1 336 554 | | 8/2003 | |
| FR | 2838094 A1 | * | 10/2003 | B62D 25/08 |
| FR | 2870197 A1 | * | 11/2005 | B62D 25/08 |
| FR | 2 899 558 | | 10/2007 | |
| FR | 2 914 618 | | 10/2008 | |
| JP | 2003040161 A | * | 2/2003 | B62D 65/00 |
| JP | 2003237652 A | * | 8/2003 | B62D 65/02 |
| JP | 2004276202 A | * | 10/2004 | B23P 21/00 |
| JP | 2005 271795 | | 10/2005 | |
| WO | 2008 139071 | | 11/2008 | |

* cited by examiner

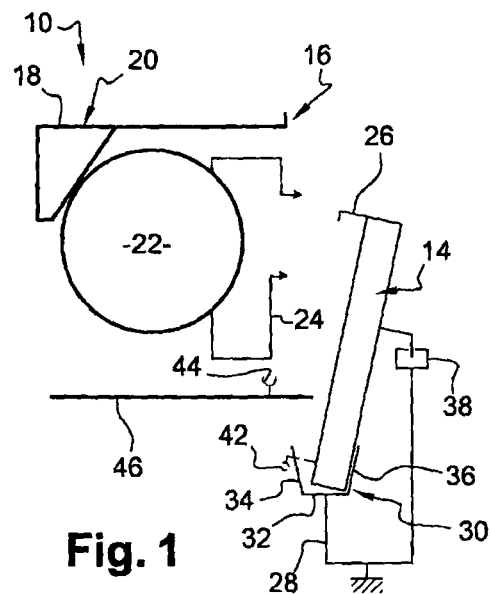
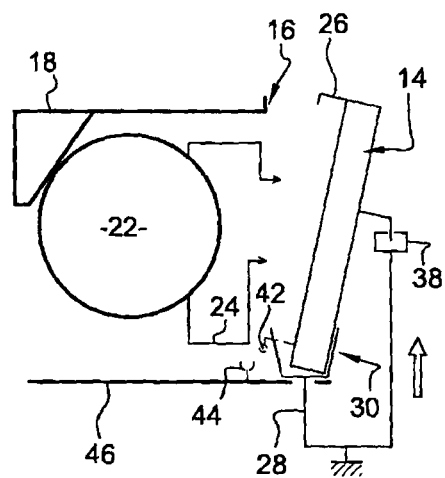
Fig. 1
Fig. 2
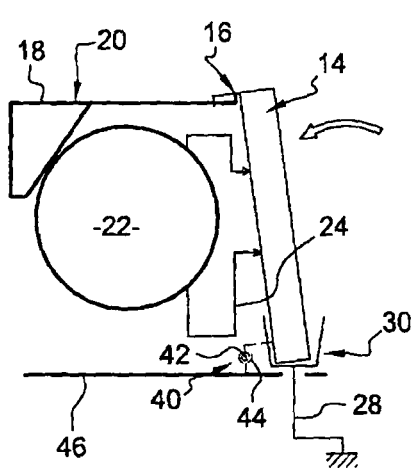
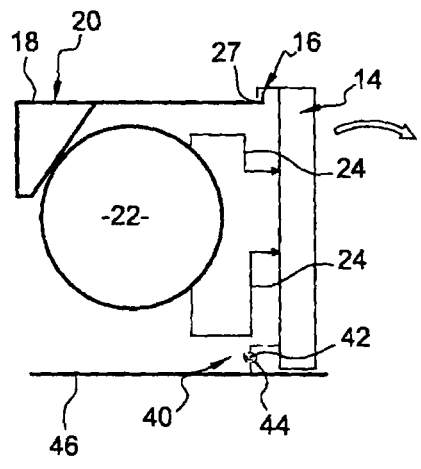
Fig. 3
Fig. 4

ARRANGEMENT FOR MOUNTING THE FRONT TECHNICAL SURFACE OF A VEHICLE

BACKGROUND

The invention relates to an arrangement for mounting, on a motor vehicle assembly line, a substantially vertical mechanical element known as the "front technical surface".

The invention relates more particularly to an arrangement for mounting, on a motor vehicle assembly line, a substantially vertical mechanical element known as the "front technical surface", notably comprising at least one cooling radiator, onto a transverse structural element of a body of the vehicle, such as an upper crossmember, the mechanical element comprising at least one substantially horizontal part, known as a "structural nozzle", intended to rest on an upper face of the upper crossmember, said arrangement comprising at least one bearing platform, bearing the mechanical element, which is intended to be slid under the body of the vehicle then raised up vertically so as notably to allow the mechanical element to be assembled with the transverse structural element of the body of the vehicle.

Numerous examples of arrangements for mounting a substantially vertical mechanical element known as the "front technical surface" on a motor vehicle body are known.

Conventionally, the substantially vertical mechanical element known as the "front technical surface", resting on a platform also known as a "sled", is brought in under the vehicle. Depending on circumstances, either the vehicle body is lowered down onto the platform or the platform is raised up under the vehicle, and the front technical surface is then attached to the body of the vehicle. This is made possible by the special design of the mechanical element or front technical surface which is conventionally attached substantially along the axis of the vehicle, so that it does not interfere with the vehicle during the relative raising-up of the sled under the vehicle.

Unfortunately, this design cannot be applied to all shapes of front technical surface.

In particular, certain front technical surfaces comprise at least one substantially horizontal part known as a "structural nozzle" which is intended to rest on an upper face of an upper crossmember of the body of the vehicle.

It will therefore be readily understood that the front technical surface cannot be brought into a position for mounting it using a vertical movement because the horizontal part of the front technical surface, which is lifted up under the crossmember during the relative raising-up of the sled under the vehicle, could collide with a lower face of the crossmember.

BRIEF SUMMARY

The invention addresses this problem by providing a design that allows the front technical surface to be mounted on the body of the motor vehicle after a conventional movement of relative raising of the sled up under the vehicle.

To this end, the invention proposes an arrangement of the aforementioned type, characterized in that the platform comprises a means, known as a "yoke", for accepting the vertical mechanical element, which yoke is capable of holding said element between at least:

a vertical position that is tilted forward, so as to allow the vertical mechanical element to be raised up with the platform without its substantially horizontal part known as a "structural nozzle" interfering with the upper crossmember, a vertical position to allow the substantially horizontal part known as a "structural nozzle" to be attached to a crossmember and the vertical mechanical element to be stood up straight.

According to other features of the invention:
the means, known as a "yoke", for accepting the vertical mechanical element is additionally capable of holding said element between at least:
  the tilted forward vertical position to allow the vertical mechanical element to be raised up with the platform without its substantially horizontal part known as a "structural nozzle" interfering with the upper crossmember,
  a tilted backward vertical position to allow at least one connecting element, notably a pipe, of a propulsion unit of the vehicle to be connected to the vertical mechanical element,
passing via the vertical position that allows the substantially horizontal part known as a "structural nozzle" to be attached to the crossmember and the vertical mechanical element to be stood up straight,
the yoke is in the form of a profile section comprising a bottom wall from which there extend a surface that is inclined toward the rear of the platform and a surface that is inclined toward the front, these surfaces being respectively associated with the tilted back and tilted forward vertical positions of the vertical mechanical element,
a locking catch is interposed between the yoke and the vertical mechanical element so as to lock said vertical mechanical element in its tilted forward vertical position while the platform is being raised up under the body of the motor vehicle,
the vertical mechanical element comprises at least one means for positioning said element with respect to the vehicle, notably a substantially vertical finger, a spherical end of which is intended to pass, without touching it, through an aperture in a lower crossmember during attachment of the vehicle.

BRIEF DESCRIPTION OF THE DRAWINGS

Further features and advantages of the invention will become apparent from reading the detailed description which follows, for an understanding of which reference will be made to the attached drawings in which:

FIG. 1 depicts the arrangement according to the invention in its tilted forward position, with the sled positioned under the body of the vehicle, FIG. 2 depicts the arrangement according to the invention in its tilted forward position, with the sled raised up under the body of the vehicle, FIG. 3 depicts the arrangement according to the invention in its tilted backward position, with the sled raised up under the body of the vehicle, FIG. 4 depicts the arrangement according to the invention in its final vertical position.

DETAILED DESCRIPTION

In the description which follows, identical reference numerals denote components which are identical or perform similar functions.

FIG. 1 depicts an arrangement 10 for mounting, on a motor vehicle 20 assembly line, a substantially vertical mechanical element 14 known as the "front technical surface" on a transverse structural element 16 of a body 18 of the vehicle 20.

The body 18 of the vehicle 20 accepts, for example, a propulsion unit 22 and the mechanical element 14 known as the "front technical surface" comprises, for example, at least one cooling radiator (not depicted) which is intended, as illustrated by FIG. 4, to be connected to the propulsion unit 22 by at least one connecting element 24 such as a pipe or a cable.

The transverse structural element 16 of a body 18 of the vehicle 20 is, for example, an upper crossmember 16 of the body 18 of the vehicle 20.

In a known way, the mechanical element 14 comprises at least one substantially horizontal part 26 known as a "structural nozzle", which is intended to rest on and be attached to an upper face 27 of the crossmember 16, as depicted in FIG. 4.

As FIG. 1 illustrates, the arrangement 10 comprises at least one bearing platform 28, bearing the mechanical element 14, which is intended to be slid under the body 18 of the vehicle 20 then raised up vertically as illustrated by FIG. 2 et seq, so as notably to allow the mechanical element 14 to be assembled with the transverse structural element 16 of the body 18 of the vehicle 20.

According to the invention, the platform 28 comprises a means 30, known as a "yoke", for accepting the vertical mechanical element 14, which yoke is capable of holding said element 14 between at least:
a vertical position that is tilted forward, depicted in FIG. 1, so as to allow the vertical mechanical element 14 to be raised up with the platform 28 without its substantially horizontal part 26 known as a "structural nozzle" interfering with the upper crossmember 16,
a vertical position, depicted in FIG. 4, to allow the substantially horizontal part 26 known as a "structural nozzle" to be attached to the upper face 27 of the crossmember 16 and the vertical mechanical element 14 to be stood up straight.

For preference, as FIG. 3 illustrates, the means 30, known as a "yoke", for accepting the vertical mechanical element 14 is additionally capable of holding said element 14 between at least:
the tilted forward vertical position depicted in FIG. 1,
a tilted backward vertical position, depicted in FIG. 3, which allows at least one connecting element 24, notably a pipe, of the propulsion unit 22 of the vehicle to be connected to the vertical mechanical element 14,
passing via the vertical position of FIG. 4 that allows the substantially horizontal part 26 known as a "structural nozzle" to be attached to the upper face 27 of crossmember 16 and the vertical mechanical element 14 to be stood up straight.

Chronologically, during the mounting process, the element 14 therefore first of all occupies the tilted forward vertical position as depicted in FIGS. 1 and 2. Then, as illustrated by FIG. 3, the vertical element 14 is tilted backward to allow the connecting element 24 to be connected. Finally, as illustrated by FIG. 4, the element 14 is stood up straight into its vertical position.

In the preferred embodiment of the invention, the means 30, known as the "yoke", for accepting the vertical mechanical element 14 is in the form of a profile section comprising a bottom wall 32 from which there extend a surface 34 that is inclined toward the rear of the platform and a surface 36 that is inclined toward the front, these surfaces being respectively associated with the tilted back and tilted forward vertical positions of the vertical mechanical element 14.

For preference, a locking catch 38 is interposed between the yoke 30 and the vertical mechanical element 14 so as to lock said vertical mechanical element 14 in its tilted forward vertical position, this being so as to allow the platform to be raised up under the body of the motor vehicle without the risk of the element 14 colliding with the crossmember 16. The catch is unlocked once the platform 28 has been raised, that is to say prior to the operation of coupling the connecting element 24, which operation has been depicted in FIG. 3.

Any technical means may be suitable for correctly producing this catch 38, which has therefore to be unfastened by an operator prior to the operation of coupling the connecting element 24, which operation has been depicted in FIG. 3.

Finally, it will be noted that, for preference, the vertical mechanical element 14 comprises at least one means 40 for positioning said element 14 with respect to the vehicle 20 so as to guarantee the geometry with which the element 14 is positioned.

This positioning means 40 may for example consist of a substantially vertical finger 40, a spherical end 42 of which is intended to pass, without touching it, through an aperture 44 in a lower crossmember 46 during attachment of the vehicle.

The invention therefore advantageously makes it easier for a front technical surface 14 to be raised up under the body 18 of a vehicle 20.

The invention claimed is:

1. An arrangement for mounting, on a motor vehicle assembly line, a substantially vertical mechanical element as a front technical surface, comprising at least one cooling radiator, onto a transverse structural element of a body of a vehicle, or an upper crossmember of the vehicle, the mechanical element comprising at least one substantially horizontal part, configured to rest on an upper face of the crossmember, the arrangement comprising:
at least one bearing platform, bearing the mechanical element, which is configured to be slid under the body of the vehicle and then raised up vertically to allow the mechanical element to be assembled with the transverse structural element of the body of the vehicle,
wherein the platform comprises a yoke for accepting the vertical mechanical element, which yoke is configured to hold the element between at least:
a vertical position that is tilted forward, so as to allow the vertical mechanical element to be raised up with the platform without the substantially horizontal part interfering with the upper crossmember, and
a vertical position to allow the substantially horizontal part to be attached to the crossmember and the vertical mechanical element to be stood up vertically.

2. The arrangement as claimed in claim 1, wherein the yoke for accepting the vertical mechanical element is further configured to hold the element between at least:
the tilted forward vertical position to allow the vertical mechanical element to be raised up with the platform without the substantially horizontal part interfering with the upper crossmember,
a tilted backward vertical position to allow at least one connecting element, or a pipe, of a propulsion unit of the vehicle to be connected to the vertical mechanical element, passing via the vertical position that allows the substantially horizontal part to be attached to the crossmember and the vertical mechanical element to be stood up vertically.

3. The arrangement as claimed in claim 2, wherein the yoke is in a form of a profile section comprising a bottom wall from which there extends a surface that is inclined toward the rear of the platform and a surface that is inclined toward the front, these surfaces being respectively associated with the tilted back and tilted forward vertical positions of the vertical mechanical element.

4. The arrangement as claimed in claim 3, further comprising a locking catch interposed between the yoke and the vertical mechanical element so as to lock the vertical mechanical element in the tilted forward vertical position while the platform is being raised up under the body of the motor vehicle.

5. The arrangement as claimed in claim 1, wherein the vertical mechanical element comprises at least one means for positioning the element with respect to the vehicle.

6. The arrangement as claimed in claim 5, wherein the at least one means for positioning the element includes a substantially vertical finger, a spherical end of which is configured to pass through an aperture in a lower crossmember, without touching the aperture, during attachment to the vehicle.

7. A method for mounting, on a motor vehicle assembly line, a substantially vertical mechanical element as a front technical surface, comprising at least one cooling radiator, onto a transverse structural element of a body of a vehicle, or an upper crossmember of the vehicle, the mechanical element comprising at least one substantially horizontal part, configured to rest on an upper face of the crossmember, the method comprising:

sliding at least one bearing platform, bearing the mechanical element, under the body of the vehicle, the platform including a yoke for accepting the vertical mechanical element;

raising the platform up vertically, including tilting the element forward on the yoke so as to allow the vertical mechanical element to be raised up with the platform without the substantially horizontal part interfering with the upper crossmember; and moving the vertical mechanical element to a vertical position on the yoke to allow the substantially horizontal part to be attached to the crossmember.

8. The method as claimed in claim 7, further comprising:

after the raising the platform up vertically, moving the vertical element to a tilted backward vertical position to allow at least one connecting element, or a pipe, of a propulsion unit of the vehicle to be connected to the vertical mechanical element, passing via the vertical position that allows the substantially horizontal part to be attached to the crossmember and the vertical mechanical element to be stood up vertically.

* * * * *